United States Patent
Leng

(10) Patent No.: US 6,525,283 B2
(45) Date of Patent: *Feb. 25, 2003

(54) MULTIFUNCTION ROCKER SWITCH

(75) Inventor: Peter Leng, Russelsheim (DE)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 209 days.

(21) Appl. No.: 09/067,949

(22) Filed: Apr. 28, 1998

(65) Prior Publication Data

US 2001/0002646 A1 Jun. 7, 2001

(30) Foreign Application Priority Data

May 6, 1997 (DE) ........................................ 197 18 979

(51) Int. Cl.[7] .............................................. H01H 23/00
(52) U.S. Cl. .................................... 200/339; 200/61.54
(58) Field of Search ................................ 200/315, 339, 200/61.57, 61.54, 293; 180/333, 78

(56) References Cited

U.S. PATENT DOCUMENTS

| | | | | | |
|---|---|---|---|---|---|
| 2,874,338 | A | * | 2/1959 | Pease ...................... | 200/339 X |
| 3,219,784 | A | * | 11/1965 | Toruk et al. ............. | 200/339 X |
| 4,518,836 | A | * | 5/1985 | Wooldridge .............. | 200/61.54 |
| 5,520,066 | A | * | 5/1996 | Tueri .................... | 200/61.57 X |
| 5,719,361 | A | * | 2/1998 | Lee ........................ | 200/339 X |
| 5,739,491 | A | * | 4/1998 | Crosson, Jr. .............. | 200/61.54 |
| 5,850,062 | A | * | 12/1998 | Botz et al. ................... | 200/315 |

FOREIGN PATENT DOCUMENTS

DE           19511878 A1      10/1996

* cited by examiner

Primary Examiner—Renee Luebke
(74) Attorney, Agent, or Firm—Thomas N. Twomey

(57) ABSTRACT

A multifunction pushbutton switch for mounting on a steering wheel (1) of an automobile comprises an oblong housing (11) accommodating a contact assembly (40) featuring circuit elements (42), comprises at least one automatically restoring pushbutton (10), a switching element (30) acting on the circuit elements (42), and comprises an actuating ridge (23) provided with two opposing actuating faces (23,26) to enable variable use of the multifunction pushbutton switch on the steering wheel (1) of an automobile, the pushbutton (10) is mounted so as to allow toggling and to be centered on the housing (11) and has a cross section which transverse to the pushbutton's mounting axis (22) is symmetric, said mounting axis (22) extending parallel to the actuating ridge (23). The housing (11) is in longitudinal section and cross section symmetric and possesses on one of its long sides (13), or centered on its underside (14), a mounting tab (18) extending essentially radially to the steering column (4) of the automobile.

1 Claim, 3 Drawing Sheets

MULTIFUNCTION ROCKER SWITCH

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention relates to a multifunction switch to be mounted on the steering wheel of an automobile, comprising an oblong housing with a contact assembly accommodating circuit elements, comprising at least one automatically restoring button with a member acting on the circuit elements, and comprising an actuating ridge with two opposing actuating faces.

An electric pushbutton switch of this type is known from DE 195 11 878 A1; it is equipped with a housing accommodating circuit elements and several automatically restoring and eccentrically mounted pushbuttons, each having a stud which acts upon the circuit elements. Each pushbutton features an actuating ridge with two opposing actuating faces, said ridge being aligned approximately axially parallel with the pushbutton mount. The actuating force introduced on the side of the pushbutton mount generally parallel with the housing has the same working direction upon the pushbutton as the actuating force introduced on the opposite side generally perpendicularly to the housing. Two diametrically opposed pushbutton switches are normally joined to the steering wheel disk of an automobile, by means of mounting flanges molded to the housing ends, such that the actuating faces of the pushbuttons protrude through an aperture between the steering wheel rim and the steering wheel disk. Such electric pushbutton switches are suited particularly to trigger switching functions, for example, for temporary speed control (Tempomat) of the automobile and/or to control operating functions of a radio-cassette unit available in the vehicle. Accommodated in the pushbutton switch housing is a printed circuit board configured as a contact assembly, with which a spring unit mounted on the housing is coordinated. Actuation of a pushbutton causes the pertaining stud to act on the spring unit and close or interrupt current paths on the printed circuit board. The latter is mounted rigidly in the housing interior. Such printed circuit boards are frequently provided with circuit elements, preferably microswitches which trigger switching and operating functions. A considerable disadvantage of the pushbutton switches is constituted by the eccentric mounting of the pushbuttons on the housing and by the disuniform design of the housing, since the one pushbutton switch is intended for left-side mounting and the other for right-side mounting on the steering wheel disk. Accordingly, the outer contour of the housing is between the steering wheel rim and the steering wheel disk adapted to this area of the aperture. Suited for that purpose is an eccentric mounting of the pushbuttons on the housing. As a result, however, the pushbutton switch can be mounted only on that side of the steering wheel disk which is intended therefor, making it necessary to fabricate for one steering wheel type two pushbutton switches of different design. This separate fabrication results in relatively high costs.

BRIEF SUMMARY OF THE INVENTION

The objective underlying the invention is to create a multifunction pushbutton switch of the initially named type which allows inexpensive fabrication and variable use on the steering wheel of an automobile.

This objective is satisfied according to the invention in that the pushbutton is mounted in toggle fashion, centered on the housing, and has a cross section which transverse to its mounting axis is symmetric, the mounting axis extending parallel to the actuating ridge, and the housing is symmetric in its longitudinal section and its cross section and possesses on one of its long sides, or centered on its underside, a mounting tab which extends generally radially to the steering column of the automobile.

The housing cross section is generally symmetric on all sides and allows, in contingence on assembly conditions and application, a rotation of the multifunction pushbutton switch about a vertical axis perpendicular to its longitudinal axis, prior to its installation on one side of the steering wheel disk of an automobile, with the mounting tab which extends radially being fitted centrally on the underside of the housing. This enables the assembly of the multifunction pushbutton switch bath in the one installation position and also in another installation position rotated 180° about the vertical axis of the switch. Owing to the symmetric longitudinal section of the housing, the multifunction pushbutton switch can be pivoted about its longitudinal axis or transverse axis and assembled to the one or the other side of the steering wheel disk, with the assembly variant described above being available additionally, due to the switch rotation by 180° about the vertical axis. If the multifunction pushbutton switch is intended only for installation on one or the other side of the steering wheel, with the switch then being turned about its transverse axis, the mounting tab is provided only on one long side of the housing. Preferably, the mounting tab is arranged centrally on the underside of the housing, which permits all rotary or pivotal movements of the multifunction pushbutton switch.

The cross-sectionally symmetric design of the pushbuttons suited for mounting on the housing allows their selective slip-on or replacement under allowance for, or in contingence upon, the installation position of the multifunction pushbutton switch and the icons showing on the buttons to symbolize the switching functions to be controlled. As a result, a single multifunction pushbutton switch may be fabricated which can be installed in any position and on any side of the steering wheel disk of an automobile. The need for fabrication of a pushbutton switch, separate for each side of the steering wheel disk, is thus eliminated and reduces production costs.

Alternatively, the objective also is satisfied by mounting the pushbutton in toggle fashion, centered on the housing, and having a cross section that is in symmetry with its mounting axis, with the mounting axis extending parallel to the actuating ridge, and by giving the housing, in longitudinal section, an asymmetric design with a mounting tab centered on its underside and extending generally radially relative to the steering column of the automobile.

The asymmetric design of the present multifunction pushbutton switch allows, in longitudinal section, a variable installation, notably due to the different curvature of the housing ends adapted to the aperture between the steering wheel rim and the steering wheel disk, for example, when the steering wheel shape has an irregular contour. Owing to the central arrangement of the mounting tab on the underside of the housing, the latter may be turned about its longitudinal axis and installed both on the one and also the other side of the steering wheel disk. The symmetrically configured pushbuttons allow a variable arrangement as needed, on the housing of the multifunction pushbutton switch.

According to an improvement of the invention, the housing features mutually spaced brackets which are arranged crosswise to its longitudinal axis and on which opposing and centered mounting pins and mounting holes are respectively provided. To enable a pushbutton to mesh with the pertaining brackets of the housing, the pushbutton possesses side flanges which are arranged crosswise to its bracket axis and possess respectively a mounting hole or mounting pin. A two-sided toggle movement of the pushbutton is achieved about the mounting axis, and which is limited only by the pushbutton rims opposing the actuating ridge.

Multifunction pushbutton switches and their central components are generally injection-molded of plastic. The brackets are suitably configured integral with the housing, the side flanges of the pushbutton integral as well, in order to lower the manufacturing expense and production costs.

Injection-molding of plastic allows providing functional elements easily on the relevant components, which elements need not be manufactured separately. Therefore, according to a further embodiment of the invention, a switching element is molded to the inside of each actuating face of the pushbutton, and the switching element extends essentially vertically to the coordinated circuit element on the contact assembly.

A further preferred provision is spring-loading the pushbutton against the housing. To that end, a stud is molded to the inside of the actuating ridge of the pushbutton. A sleeve is formed on the base of the housing, which accommodates a spring-loaded follower pin and is directed at the actuating ridge of the pushbutton, with the follower pin bearing on a cam. The spring-loaded follower pin aids the toggle movement and resetting of the pushbutton relative to the housing.

According to an improvement of the inventional solution, the contact assembly is detachably retained on the housing base by means of clamping elements formed on the housing. The contact assembly is thus positionally secured in the housing. But the detachable clamping enables also a 180° rotation of the contact assembly containing the circuit elements, so that the latter are located either on the one or the other long side of the housing. Depending on the installation position of the multifunction pushbutton switch, the contact assembly can thus be fitted in the respective position in the housing and fastened there.

The contact assembly is preferably configured as a printed circuit board, its circuit elements being microswitches, bridges or the like. Microswitches have been found to be particularly suitable, due to their high operational fitness and easy and inexpensive manufacture.

In a favorable embodiment of the invention, the pushbutton switch is mounted in the area of the steering wheel of an automobile, such that a driver's hand gripping the steering wheel rim can engage with the thumb the one actuating face of the pushbutton and with the fingers the other actuating face, the hand finding support on the steering wheel rim. Hence, the required actuating force is very easily controlled. The actuating force is introduced in keeping with the natural thumb or finger movement, and the grip around the steering wheel rim need not be released in actuating the multifunction pushbutton switch.

To allow for the physical particulars and for the alignment of the thumb and finger joints, the multifunction pushbutton switch is according to a favorable improvement coordinated with the steering wheel rim such that the actuating ridge of the pushbutton extends behind the steering wheel rim approximately parallel with it and set back. This provides an optimum coordination of the pushbutton with the fingers and the thumb.

In a further embodiment, the housing is joined to the steering wheel by means of a mounting tab, with the actuating faces of the pushbutton protruding through an aperture in a steering wheel disk surrounding the steering wheel hub and with no steering wheel spokes provided in the area of the pushbutton. As the steering wheel is turned, the pushbutton follows along at the same angle. Pushbutton actuation is possible also in critical situations, without taking one's hand off the steering wheel. Furthermore, an unobstructed view of the pushbutton is always assured.

Moreover, the actuating face of the pushbutton near the operator features preferably at least one transparent or opaque icon surface illuminated by an illuminating element arranged beneath the pushbutton. Especially at night and also in a phase when an operator is getting accustomed to a pushbutton combination, the display and illumination of the icon surface for the switching function precludes erroneous operation. By turning or replacing it, the pushbutton can be used at the spot of the multifunction pushbutton switch where the relevant switching function is provided for on the contact assembly, corresponding to the icon on the pushbutton's icon surface. An icon surface may be provided, also on any actuating face of the pushbutton, in order to further enhance the usage variations of the pushbutton.

In order to direct the fall light intensity at the icon surface of the pushbutton and to shield its surroundings from the light effect, a light guide which eliminates scatter light extends from the housing base perpendicularly to the icon surface on the actuating face of the pushbutton.

The pushbutton switch mounted on the steering wheel also suitably comprises at least three adjacent pushbuttons, thus allowing several switching functions on a single electric pushbutton switch. The center or outer pushbuttons feature in this case, on their side flanges facing one another, sealing collars which bridge the clearance between adjacent pushbuttons. The sealing collars prevent dirt from penetrating the electric pushbutton switch. Furthermore, the unintended radiation of light given off by the illuminating element contained in the housing is prevented.

To be able to utilize the space available on the steering wheel rim, especially between two steering wheel spokes, and to realize many switching functions, preferably two diametrically opposed pushbutton switches are arranged in the area of the steering wheel. Different switching functions may thus be assigned to the buttons of each pushbutton switch and to the circuit elements of the contact assembly. Thus it is possible to assign to the buttons of each pushbutton switch and to the circuit elements of the contact assembly switching functions for controlling the road-holding properties of the automobile or for controlling a radio and/or tape player and/or CD player and/or CD changer installed in the automobile.

BRIEF DESCRIPTION OF THE DRAWINGS

The idea underlying the invention is more fully explained in the following description, with the aid of two exemplary embodiments depicted in the drawing, which shows in.

DETAILED DESCRIPTION OF THE INVENTION

Figure 1:
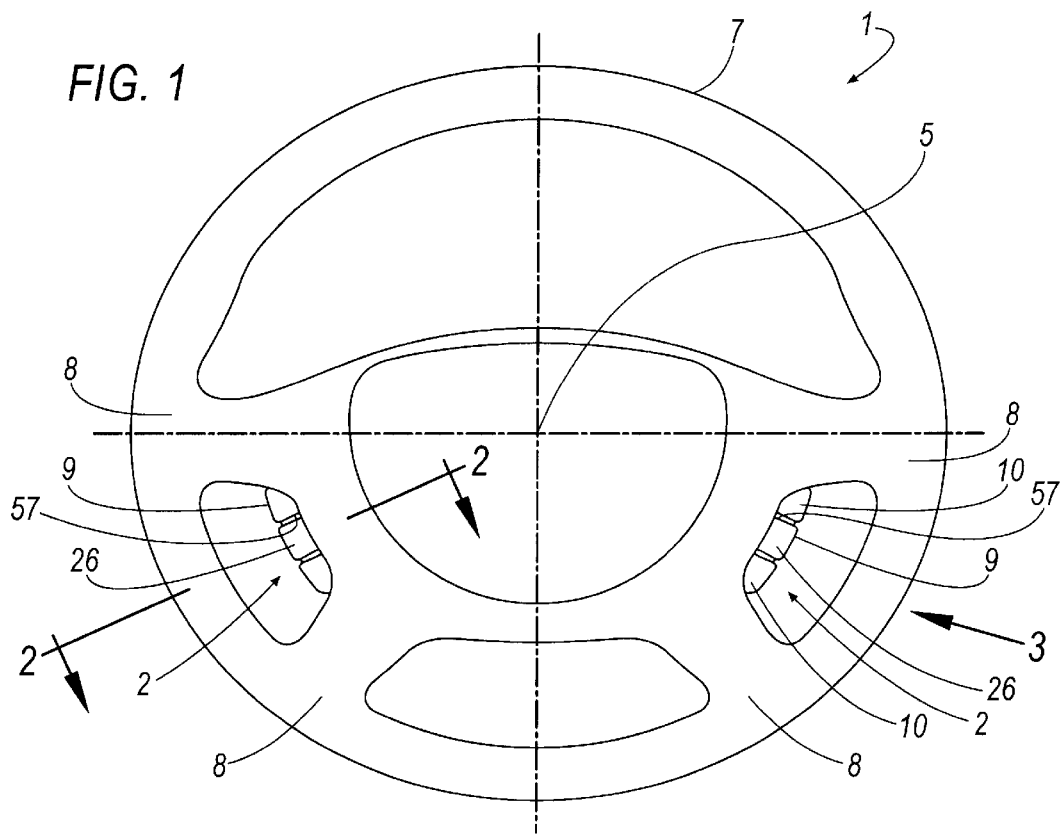
FIG. 1, a view of the steering wheel of an automobile, with two multifunction switches.
Figure 2:
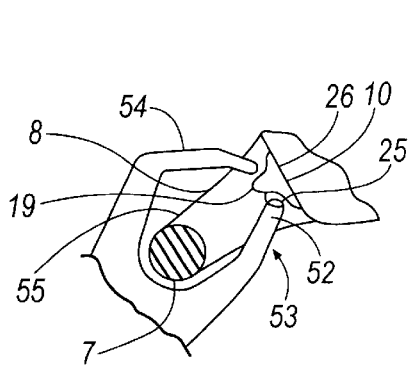
FIG. 2, a cross section of the steering wheel according to FIG. 1, along line II—II.
Figure 3:
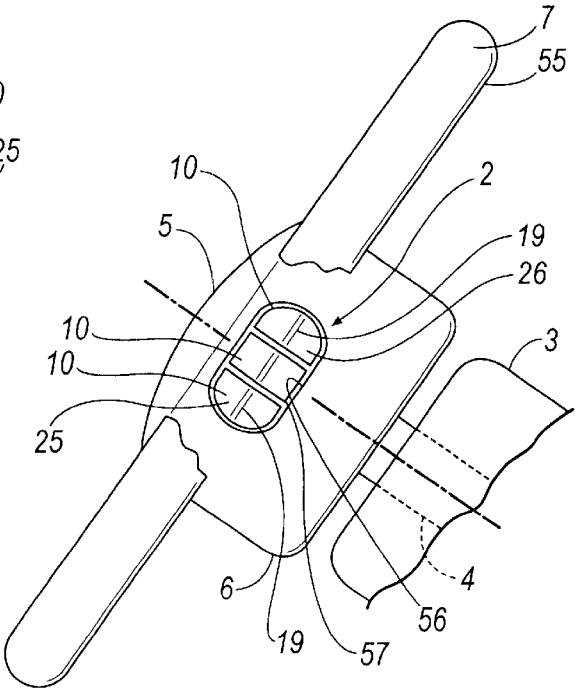
FIG. 3, a view of the steering wheel according to FIG. 1 in the direction of arrow III, with portions of the steering wheel rim broken away.

FIGS. 1 through 3 illustrate a steering wheel 1 with a coordinated switch unit 2. Located behind the steering wheel 1 is a jacket 3 in which the steering column 4 is mounted, which on its end contains the steering wheel indicated generally at 1. Arranged concentrically with the steering wheel 1 is the steering wheel hub 5, surrounded by the steering wheel disk 6. The steering wheel disk 6 contains the airbag, the horn contact and an electric connecting system establishing the contact between the rotating steering wheel 1 and the fixed steering column jacket 3. The steering wheel 1 possesses a steering wheel rim 7 joined by way of steering wheel spokes 8 to the steering wheel disk 6 surrounding the steering wheel hub 5. Arranged in the steering wheel disk 6, the switch unit indicated generally at 2 consists of two multifunction switches 9, hereafter referred to as pushbutton switches, of which one is arranged on each side of the steering wheel 1. Each pushbutton switch 9 comprises three buttons 10, which are arranged side by side and within the driver's view.

Figure 4:
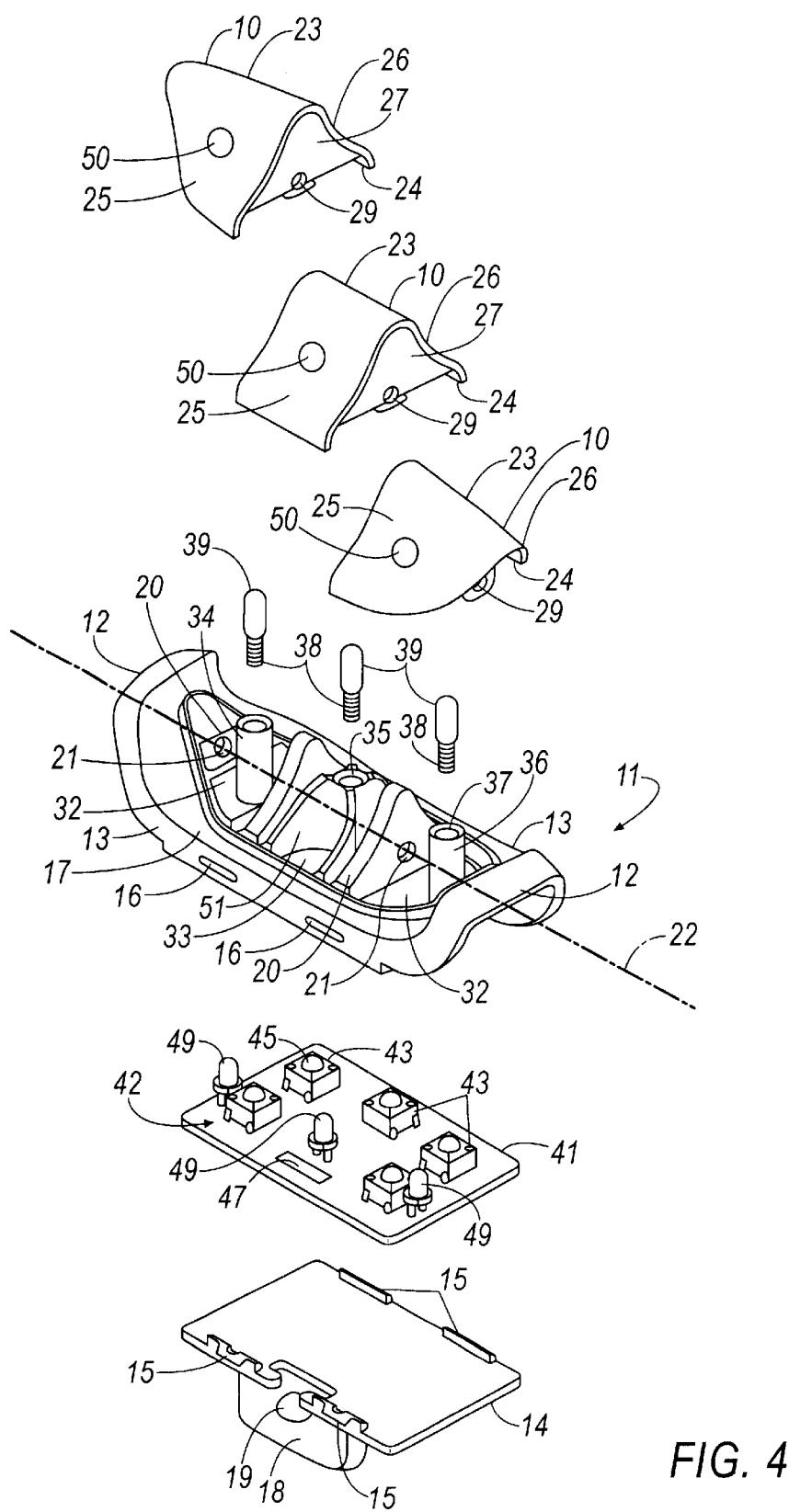
FIG. 4, a perspective exploded view of a multifunction pushbutton switch according to the invention, in a first embodiment.
Figure 5:
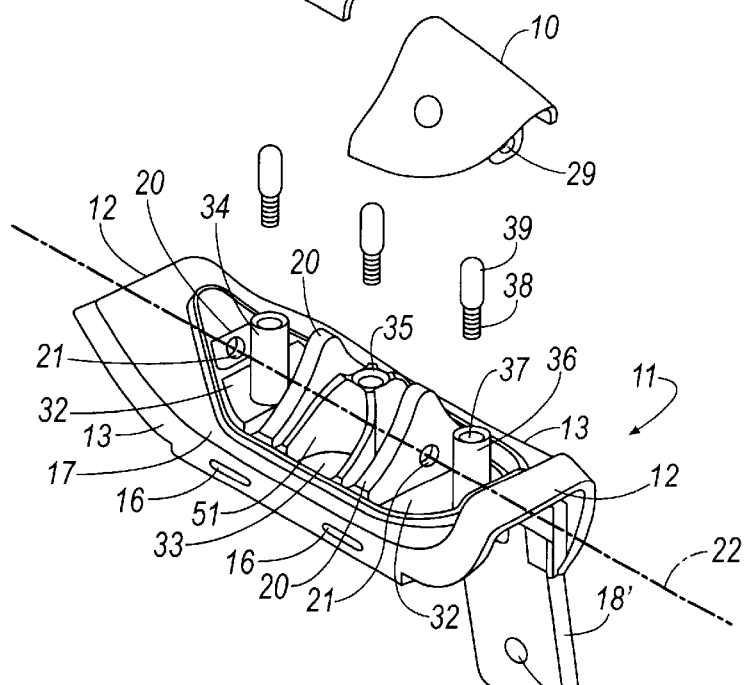
FIG. 5, a perspective exploded view of an inventional multifunction pushbutton switch according to a second embodiment, and FIG. 6, a back side view of a button of a multifunction pushbutton switch.
Figure 5:
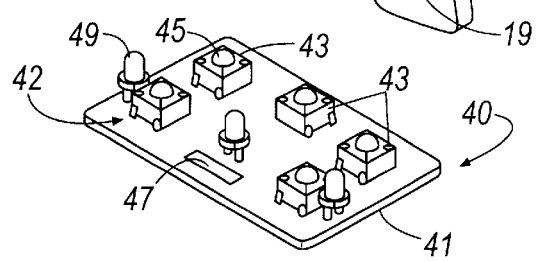
Figure 5:
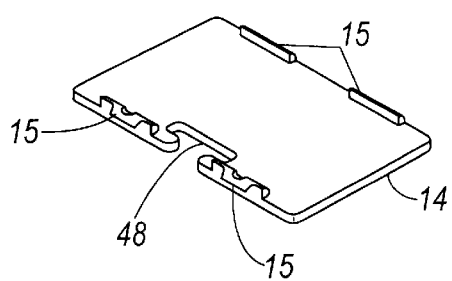

According to FIGS. 4 and 5, the pushbutton switch 9 has an approximately rectangular housing indicated generally at 11 with end sides 12 and long sides 13. The rim of the long sides 13 and of the end sides 12 of the housing 11 is relieved above the pushbuttons 10. The rim serves as a spacer between the steering wheel aperture 56 and the pushbuttons 10, to prevent the pushbuttons 10 from being affected by the steering wheel hub 5. Provided on the underside of the housing 11 is a bottom plate 14 having clip lugs 15 which are spaced endwise. Clip lugs 15 engage matching clip openings 16 in the long sides 13 of the housing 11. Furthermore, the housing 11 possesses a base 17, which is somewhat wider than the pushbuttons 10.

According to the embodiment illustrated in FIG. 4, the end sides 12 curve upward evenly, so that the housing 11 is symmetric in cross section and longitudinal section.

In the embodiment according to FIG. 5, one end side 12 of the housing 11 is curved less than the other end side 12. Hence, the housing 11 is symmetric in cross section, but asymmetric in longitudinal section. A mounting tab 18 is molded to the housing 11, and extends on the long side 13 of housing 11. Mounting tab 18 is provided with two mounting holes 19, for attachment to the disk 6 of the steering wheel 1. Referring to FIG. 4, the mounting tab 18 is molded on the housing 11 symmetric in longitudinal section and cross section, centered to the bottom plate 14, and protruding away from it.

The base 17 of housing 11 is provided with mutually spaced brackets 20 having essentially triangular shape. Injection-molded to the sidewalls of the brackets 20 are mounting pins 21 for receiving the pushbuttons 10, aligned along a mounting axis 22.

Each of the pushbuttons 10 has an essentially triangular cross-sectional shape. Formed on the top of each pushbutton 10 is an actuating ridge 23 aligned approximately axially parallel to the mounting axis 22 and spaced from it. The surfaces extending on both sides of the pushbutton rim 24 toward the actuating ridge 23 are the actuating faces 25 and 26. Perpendicular to the mounting axis 22 end flanges 27 protrude toward the actuating faces 25 and 26 and form the end walls of the pushbutton 10. The end flanges 27 are offset somewhat toward the interior of the pushbutton 10, so that lateral sealing collars 28 are formed (see FIG. 6). Each end flange 27 has formed therein a mounting bore 29 meshing with the corresponding mounting pin 21 of the bracket 20 on the base 17 of housing 11, making the pushbutton 10 operable for movement about the mounting axis 22.

Figure 6:
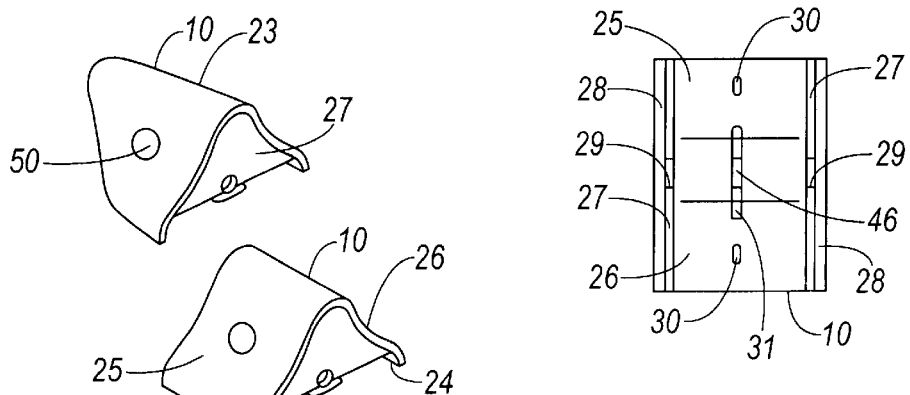

As evidenced particularly in FIG. 6, a lug-like switching element 30 is provided in the interior of pushbutton 10 and is preferably molded to the actuating faces 25 and 26. Furthermore, a cam 31 is molded to the back of actuating ridge 23 in its center.

The base 17 is divided in two outer base areas 32 and a center base area 33 for the three pushbuttons 10. For each pushbutton 10, a sleeve or port 34, 35 and 36, each with a blind hole 37, protrudes in the base areas 32 or 33. A follower pin 39, spring-loaded by a compression spring 38, is inserted in each sleeve 34, 35, 36, the compression spring 38 resting inside the blind hole 37 of the sleeve 34, 35, 36. The front end of follower pin 39 rests on the pertaining cam 31.

A contact assembly 40 is inserted in the base 17 of housing 11 and configured as a printed circuit board 41. A plurality of circuit elements 42 are configured as microswitches 43 and mounted on the printed circuit board 41, one microswitch 43 always being coordinated with one pushbutton 10 or one of its actuating faces 25 or 26. The contact assembly 40 is fitted in the housing 11. Thereafter, the underside of base 17 is sealed by the bottom plate 14, such that the clip lugs 15 engage on the bottom plate 14 the pertaining clip openings 16 in the base 17 of housing 11. In the process, a lug-like switching element 30 on the back of one of the actuating faces 25 or 26 of pushbutton 10 makes contact with the switch button 45 of microswitch 43. Upon actuation of the respective actuating face 25 or 26 of pushbutton 10, the corresponding microswitch 43 is actuated and triggers a switching or control function. As the actuating face 25 or 26 of pushbutton 10 is released, the switch button 45 of microswitch 43 pushes on the switching element 30, causing the pushbutton 10 to restore to its home position. This return motion is aided by the follower pin 39 spring-loaded by the compression spring 38, in that the tip of follower pin 39 pushes on the cam 31. The cam 31 features a central detent recess 46 through which the follower pin 39 always tends to center the pushbutton 10 in its home position.

Soldered to a spot 47 on the printed circuit board 41 are unshown leads, which via a cutout 48 in the bottom plate 14 extend out of the housing 11, terminating in a not illustrated plug. Mounted on the printed circuit board 41, additionally, are illuminating elements or lamps 49, each coordinated with a pushbutton 10. The actuating faces 25 and 26 of pushbutton 10 each have either a transparent or an opaque icon surface 50 symbolizing a specific switching or control function. It will be understood that, upon activation of the illuminating element 49, light shines though the transparent icon surface 50 in the actuating faces or through surfaces 25 and 26 of pushbutton 10 if the icon is opaque. In the not illuminated state of the pushbutton 10, recognition of the switching or control functions is made possible by (not illustrated) tactile icons applied on the actuating faces 25 and 26. Coordinated with the actuating faces 25 or 26 of at least the center pushbutton 10, is a light barrier 51 configured on the base 17 of housing 11 and directed at the pertaining icon surface 50 of an actuating face 25 or 26 of pushbutton 10. The icon surface 50 is, by the corresponding illuminating element 49, backlit without occurrence of scatter light.

Referring to FIG. 2, the housing 11 of pushbutton switch 9 is, in the area of the steering wheel 1, mounted via the mounting tab 18, such that the driver's hand gripping the steering wheel rim 7 is with its thumb 52 located before the actuating face 25 of pushbutton 10 and an actuating force can thus be introduced in the direction of arrow 53 in FIG. 2. The most favorable arrangement is given whenever the actuating ridge 23 is disposed approximately parallel to the steering wheel rim 7 at the level of the back 55 of steering wheel rim 7, which is the side of the steering wheel 1 away from the driver. The other actuating face 26 of pushbutton 10 can be actuated with a finger 54.

The two pushbutton switches 9 each disposed on an opposite side of the steering wheel 1, as illustrated in FIGS. 1 and 3, are fitted in an aperture 56 formed in the steering wheel disk 6. The contour of aperture 56 matches the outer contour of pushbutton switch 9 and is just large enough for the pushbuttons 10 to protrude there with their actuating faces 25 and 26 on their actuating ridge 23 and to be freely movable.

The steering wheel disk 6 also covers the area of housing 11 protruding beyond the pushbuttons 10. The pushbutton switch 9 is always mounted on the steering wheel 1 at a spot where no steering wheel spokes 8 are disposed in front of the pushbuttons 10 of pushbutton switch 9. A slight clearance 57 is formed between adjacent pushbuttons insuring a free movement of the pushbuttons 10 relative to one another.

The steering wheel 1 shown in FIG. 1 has four steering wheel spokes 8. The spacing between two of the steering wheel spokes 8 is such that the pushbuttons 10 of pushbutton switch 9 are in view directly between the two steering wheel spokes 8. The driver has thus an unobstructed view upon the pushbuttons 10 or their actuating faces 25.

Each icon surface applied on the actuating faces 25 or 26 defines a specific function, for instance, switching relating to operations of a radio-cassette unit. Different functions may be assigned to the icon surfaces of the pushbuttons 10, e.g., the functions of station scanning, volume/reversing functions or also functions influencing the speed of travel, such as for instance cruise control on the automobile.

Although the invention has hereinabove been described with respect to the illustrated embodiments, it will be understood that the invention is capable of modification and variation and is limited only by the following claims.

What is claimed is:

1. A multifunction switch for mounting on a vehicle steering wheel and having an elongated housing having a contact assembly with a switching element and circuit elements disposed therein comprising:

(a) at least one actuator member disposed on said housing for pivotal movement about an axis in opposite directions from a neutral position, said member having a symmetric ridged configuration in transverse section with a ridge extending generally parallel to said axis; and, (b) said housing having a generally symmetric configuration in the elongated direction and transversely and having a centrally located mounting tab extending therefrom in a radially inward direction with respect to the vehicle steering wheel, wherein said actuator is operative upon said pivotal movement to act on said circuit elements for causing a switching function.

* * * * *